United States Patent [19]

McFiggans et al.

[11] Patent Number: 4,507,744

[45] Date of Patent: Mar. 26, 1985

[54] ACCESSIBLE HOUSING FOR ELECTRONIC SYSTEM

[75] Inventors: Robert B. McFiggans, Stamford; Arno Muller, Westport, both of Conn.

[73] Assignee: Pitney Bowes Inc., Stamford, Conn.

[21] Appl. No.: 399,594

[22] Filed: Jul. 19, 1982

[51] Int. Cl.[3] ............................................... G06F 15/21

[52] U.S. Cl. ..................................... 364/708; 364/464

[58] Field of Search ................ 364/464, 708; 361/380, 361/390, 344; 200/50 A, 50 AA; 324/110

[56] References Cited

U.S. PATENT DOCUMENTS

| | | | |
|---|---|---|---|
| 3,882,291 | 5/1975 | Chiboroski | 200/50 A |
| 4,280,180 | 7/1981 | Eckert et al. | 364/464 |
| 4,310,754 | 1/1982 | Check, Jr. | 364/464 |
| 4,424,573 | 1/1984 | Eckert et al. | 364/464 |

*Primary Examiner*—David H. Malzahn

*Attorney, Agent, or Firm*—Joseph A. Sawyer, Jr.; William D. Soltow, Jr.; Albert W. Scribner

[57] ABSTRACT

A secured housing for an electronic device having an electronic memory mounted therewithin is provided which has as access aperture which provides tamper proof security and electro-magnetic interference protection while permitting access to the memory for reading the information maintained in the memory. Opening of the access aperture disables the electronic device from further operation by unlatching a switch which disconnects the electronic device from its power supply while preventing relatching of the switch to reactivate the electronic device. Use of the access aperture provides a visible indication of access to the interior of the housing. In one embodiment of the invention, the electronic device is an electronic postage meter and the electronic memory is a nonvolatile memory containing postage accounting information.

11 Claims, 4 Drawing Figures

ACCESSIBLE HOUSING FOR ELECTRONIC SYSTEM

RELATED APPLICATIONS

This application is related to U.S. Pat. No. 4,421,977 filed on July 19, 1982 and entitled "SECURITY SYSTEM FOR ELECTRONIC DEVICE" which is assigned to the assignee of the present invention. The specific and entire disclosure of the aforementioned application is specifically incorporated herein by reference for the purpose of further explaining the nature and operation of the present invention.

BACKGROUND OF THE INVENTION

This application relates generally to an accessible secured housing for an electronic system and more specifically to an accessible secured housing for an electronic metering device such as an electronic postage meter.

Electronic postage meters are well known devices for imprinting postage impressions of desired value directly on an article to be mailed or on an adherent tape to be affixed to the article. Such meters commonly include a keyboard for the entry of postage information to be printed, a display for displaying postage information to be printed, one or more microprocessors and peripheral circuits for controlling various meter functions and operations including the entry of data to the registers and activation of a printing mechanism, an electronic accounting device including internal memory registers for maintaining accounting information and a printing mechanism for imprinting the postage information. The accounting information maintained in the memory registers may include a control total representing the total amount of postage paid for, an ascending balance representing the total amount of postage printed and expended and a descending balance representing the total balance of postage remaining.

Prior to using a meter, a user must purchase an amount of postage from the postal service. The term "postal service" as used herein means either a governmental postal service or an authorized private carrier. In one typical system, a postal service agent or employee alters the contents of the internal memory register to reflect the amount of postage paid for and sets or increases the control total and descending balance so as to reflect the amount of postage purchased. In order to use the meter, the user selects a postage value to be imprinted and activates the postage printing mechanism. The postage meter may be used continuously until the descending balance reaches a pre-determined minimum (i.e. until the postage paid for has been exhausted or has reached a pre-determined minimum threshold value required for operation).

Since the accounting information represents the equivalent of money, it is apparent that stringent security safeguards are necessary to protect this information. In particular, the security safeguards must insure that all postage printed must be paid for. For this reason the printing actuating mechanism and the accounting registers are located within a secured housing and access thereto is restricted, in general, to postal service employees or to employees at the manufacturer's special meter repair facility. Additional security in electronic postage meters is provided by programmed safeguards employed in the operation of the system. Such safeguards are shown and described in U.S. Pat. No. 3,938,095 issued Feb. 10, 1976 and U.S. Pat. No. 3,978,457 issued Aug. 31, 1976, both of which patents are assigned to the assignee of the present invention. European patent publication No. 0019515 published Nov. 26, 1980 also describes such safeguards. Such programmed safeguards do not form part of this invention and are not further described.

Electronic postage meters inherently rely for their operation on continuous electric power, and interruption in such power including either a loss of electric power, a decrease in the electric power below a required minimum line voltage or a fluctuation in the power can threaten the security of electronic postage meters in at least two ways. First, the electronic memory registers which retain the accounting information usually require continuous power for their operation and thus a power interruption can result in a loss of accounting information. Second, a power interruption can affect the operation of the logic and control circuit elements within the meter such that their operation is erratic thus resulting in entry of erroneous data to the memory registers. Accordingly, as a further security safeguard, a separate and redundant set of memory registers in the form of a nonvolatile memory is provided, which nonvolatile memory does not rely on continuous external power and thus retains the accounting information even though a power interruption occurs. Such nonvolatile memories may be inherently nonvolatile such as a semiconductor bubble memory or may rely on an auxiliary power source such as a battery. In this manner accounting data is maintained even in the event of a power interruption. As noted, the accounting information has a value similar to that of money and thus the accounting data maintained in the nonvolatile memory is maintained in a secured housing and may be accessed only by postal employees or employees of the manufacturer's meter repair facility during normal operation.

When the descending balance reaches a pre-determined minimum, the postage meter must be recharged, that is control data and descending register data must be reset to reflect an increase in the amount of postage paid for. This is done at the postal service facility by postal service agents or employees or by a remote resetting mechanism such as that shown and described in U.S. Pat. No. 4,097,923 issued June 27, 1978 and assigned to the assignee of the present invention.

The postal service requires access to the registers in the memory for resetting or for periodic inspection of the meter. In particular, when a meter is taken out of service, it is necessary to read the registers to determine the balance available and to properly refund or credit the remaining balance of funds to the customer. In addition, it is desired to clear the descending register to zero under these circumstances. As a result, a problem occurs where a malfunction in a meter occurs in circuits peripheral to the nonvolatile memory such as the microprocessor control circuits, power supply or isolation circuits. In such a case, immediate access to the memory registers is not possible at the postal service location and the meter must be returned to a repair facility for read out of the postage funds balance from the register. As a result a substantial period of time elapses during which the customer does not have access to the postage funds he has paid for and which remain on his control total and descending balance in the registers contained in his inoperative meter. It would be desirable to access the accounting information in the event of such a malfunction and transfer it immediately into a replacement meter thus providing the customer with substantially immediate access to his postage funds balance and to thereafter render the meter inoperative.

Accordingly, an auxiliary communication channel is provided containing read access lines to the nonvolatile memory. Access to this communication channel is provided through a sealed access aperture or door, which provides tampering and electromagnetic interference protection, but is designed for operation on a single occasion only. Access through the door precludes further normal meter operation by deactivating the meter in such a manner that reactivation is not possible without destruction of the meter housing. Thus, the customer has immediate access to his postage funds while protection of the data and prevention of unauthorized alteration of the postage funds balance as well as unauthorized use of the meter and in particular its printing mechanism is achieved.

It will be understood that, although the present invention is described in conjunction with a preferred electronic postage meter embodiment, the invention is applicable to other electronic calculating devices employing a secured housing enclosing and preventing access to an electronic control circuit and nonvolatile memory containing accounting data such as voting machines, parimutual machines, and electronic franking machines.

SUMMARY OF THE INVENTION

Briefly stated, and in accordance with one embodiment of the present invention, there is provided an electronic postage meter having a secured housing which encloses a nonvolatile memory containing accounting information and an access aperture designed for use on a single occasion. The aperture is an integral part of the secured housing and provides both tamper proof security and electromagnetic interference protection as does the secured housing itself. Use of the one time access aperture, which may be in the form of a break-away door, permits electronic probing of the nonvolatile memory for reading out the accounting information contained therein but precludes providing means for writing additional or changed information into the nonvolatile memory and provides a visible indication that the aperture has been accessed. Further, the opening of the access aperture disables the meter from further normal operation.

BRIEF DESCRIPTION OF THE DRAWINGS

Other objects and advantages of the present invention will become apparent upon a reading of the following detailed description and upon reference to the drawings wherein.

While the present invention will be described in connection with a preferred embodiment thereof, it will be understood that it is not intended to limit the invention to that embodiment only. On the contrary, it is intended to cover all alternatives, modifications and equivalents as may be reasonably included within the spirit and scope of the invention as defined by the appended claims.

DETAILED DESCRIPTION OF THE INVENTION

Figure 1:
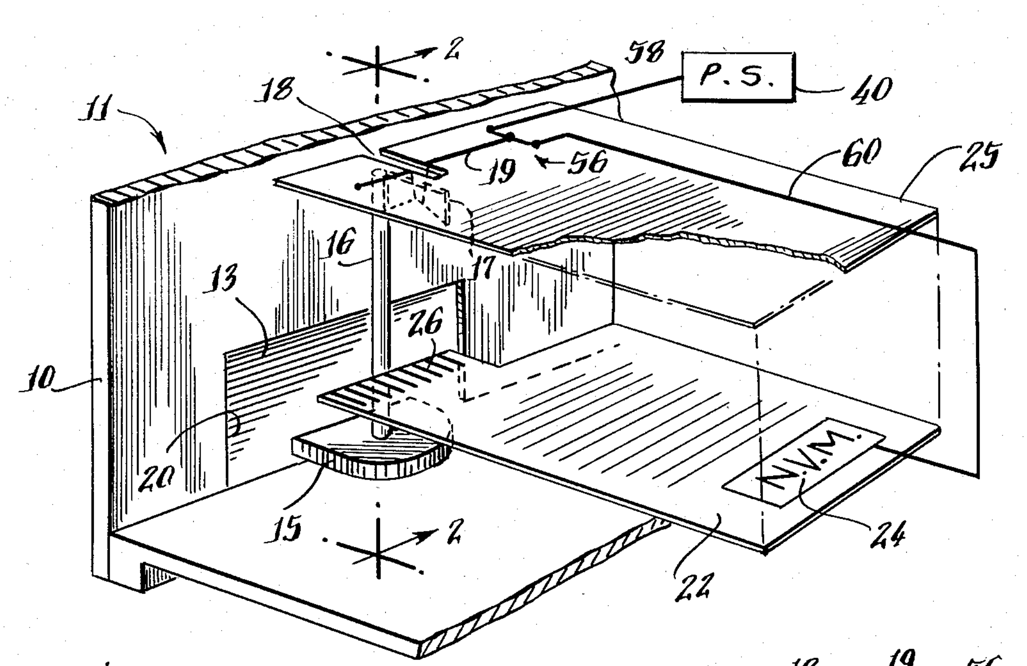
FIG. 1 is a perspective, partially broken, view of one embodiment of the present invention.
Figure 2:
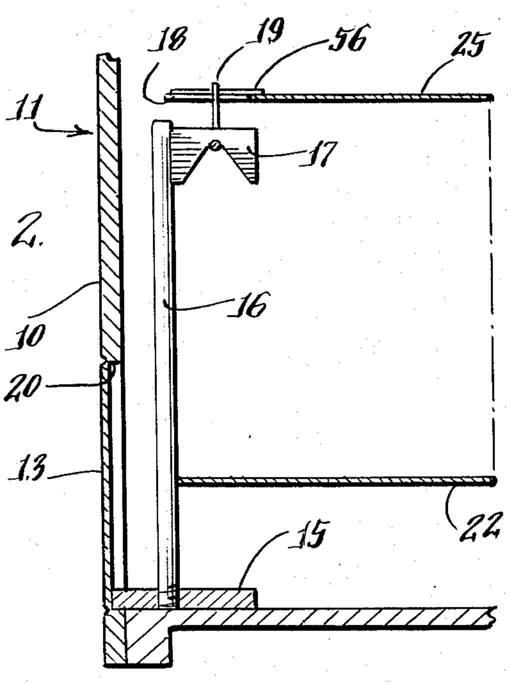
FIG. 2 is a section of FIG. 1 taken on line 2—2.
Figure 4:
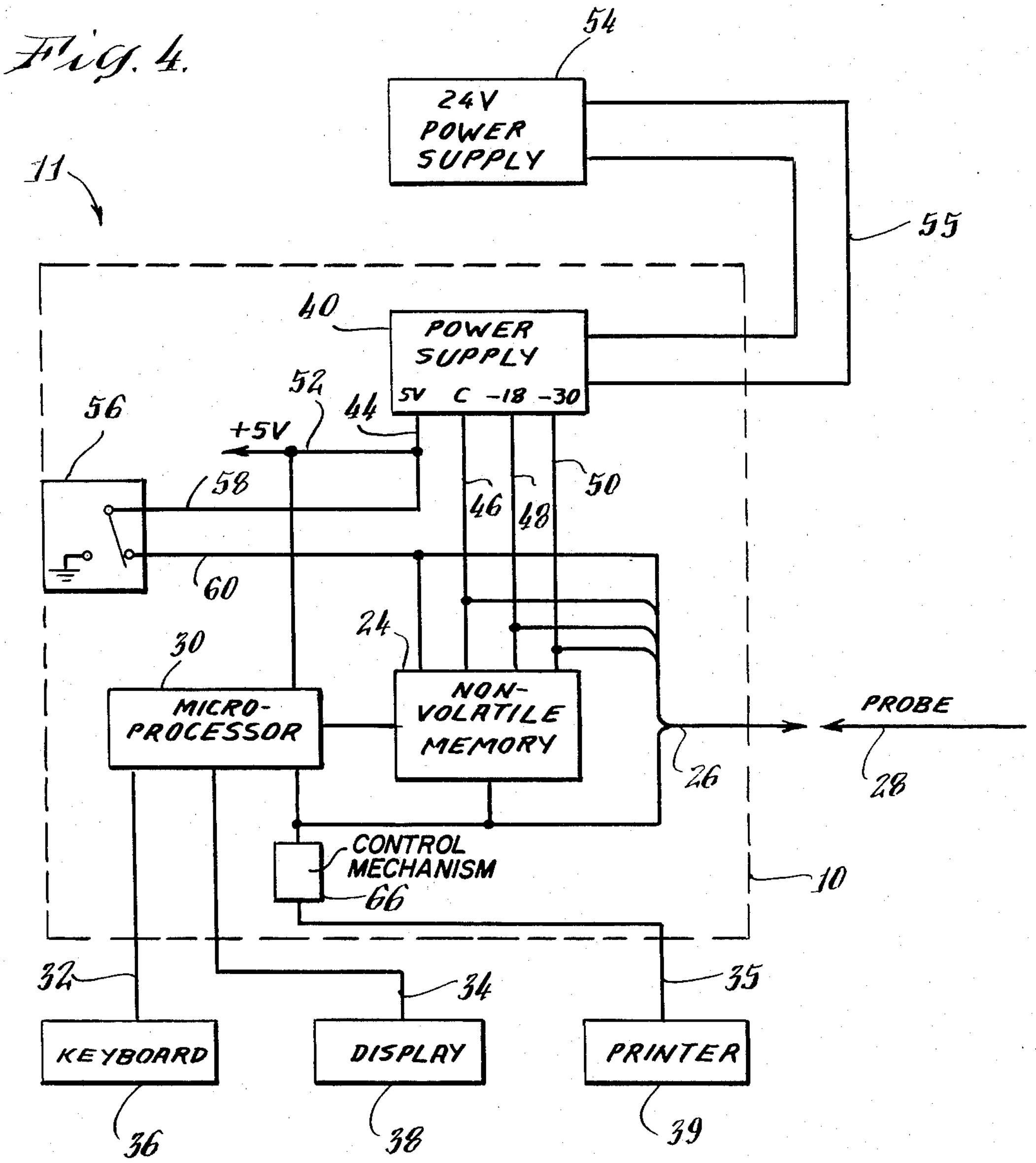
FIG. 4 is a schematic showing of the circuit employed in a postage meter embodiment of this invention.

Referring now to the drawings, particularly FIGS. 1 and 2, there is shown, in one embodiment of this invention, a portion of an electronic postage meter 11 having a secured exterior housing 10. The housing 10 is designed to provide security from tampering including unauthorized access to the interior of the housing where accounting information is retained in a nonvolatile memory 24 and where microprocessor control circuits 30 may be actuated as will be explained in further detail later (FIG. 4). Further, the housing provides protection from electromagnetic interference for the electronic components contained within housing 10.

Mounted within housing 10 is a printed circuit board 22 having a nonvolatile memory 24 mounted thereon. An electrical communication channel 26 from nonvolatile memory 24 is provided on printed circuit board 22 and is shown in the form of lead lines directed toward aperture 20. Aperture 20 provides access to communication channel 26 for an electronic probe connector 28 (FIG. 4) which electrically engages communication channel 26 in a male-female connection to provide electrical access to the register of nonvolatile memory 24.

Referring to FIG. 4, an electronic postage meter 11 is shown schematically including secured housing 10 within which is enclosed a microprocessor control circuit 30, nonvolatile memory 24 and power supply 40. External to the housing 10, and in electrical communication therewith through circuit connections 32, 34 and 35, which may include optical isolation circuits, not shown, are keyboard 36, display 38 and postage printer 39, respectively. Although the printer 39 is shown schematically exterior to housing 10, it is to be understood that the control mechanism 66 therefor is located within secure housing 10 to provide tamper-proof security protection therefor.

As shown in FIG. 4, the power supply 40 supplies various voltage levels to elements of the microprocessor control circuit 30, the nonvolatile memory 24, and through 5 volt outlet 52, to other peripheral circuits, not shown, through connections 44, 46, 48, and 50 respectively. Electrical connection of power supply 40 to the electronic elements of postage meter 11 is made through switch 56 which connects 58 and 60 in the position shown in FIG. 4. Power supply 40 may also be connected to an external power supply 54 through isolation circuit 55.

Access to nonvolatile memory 24 may be achieved through an auxiliary multiple output communication channel 26 which is accessed through the exterior of housing 10 by electrical probe connector 28. In a preferred embodiment, probe 28 accesses the read lines only of nonvolatile memory 2 and thus communication channel 26 includes the read lines only for memory 24. Thus accessing of communication channel 26 by probe 28 permits readout of the contents of the registers of nonvolatile memory 24 only, while the capability of writing in or changing the information contained in nonvolatile memories 24 is precluded when accessing memory 24 through probe 28. Under certain circumstances where other security measures permit, an alternate embodiment may be desirable in which communication channel 26 includes both the read and the write lines to nonvolatile memory 24. This construction permits reading the balance in the registers and thereafter resetting the meter registers to zero.

Referring to FIGS. 1 and 2, aperture 20 in housing 10 is provided by means of a reduced thickness portion of the housing 10. The reduced thickness portion permits break away portion to form a break-away door 13 and permit access to communication channel 26 located within housing 10. Mounted on or formed integrally with break-away door 13 is a mounting member 15 having a lever arm 16 with a V-shaped or hooked portion 17 mounted thereon. An actuating member which may be in the form of a wire or flexible rod 19 is mounted securely at one end on circuit board 25 and at the other end on switch 56. Intermediate its ends, the wire 19 is threaded through slot 18 in board 25 and securely around hook portion 17. Opening break-away door 13 draws hook portion 17 downward from the position shown in FIG. 1, thereby moving switch 56 to an open circuit position thereby disengaging memory 24 from power supply 40. If additional security is desired, opening of door 13 can be made to move switch 56 to a grounded position (as shown in FIG. 4), thereby disengaging power supply 40 from the electronic components of the meter 11 thereby disabling the meter. In addition, breaking away door 13 provides a visual indication that the meter has been accessed. Switch 56 may be in the form of an electromechanical or electrical switch which can only be returned to the closed circuit position shown in FIG. 1 by completely disassembling the meter. Alternatively, switch 56 may simply be a break-away portion of the output line 58 from power supply 40.

Figure 3:
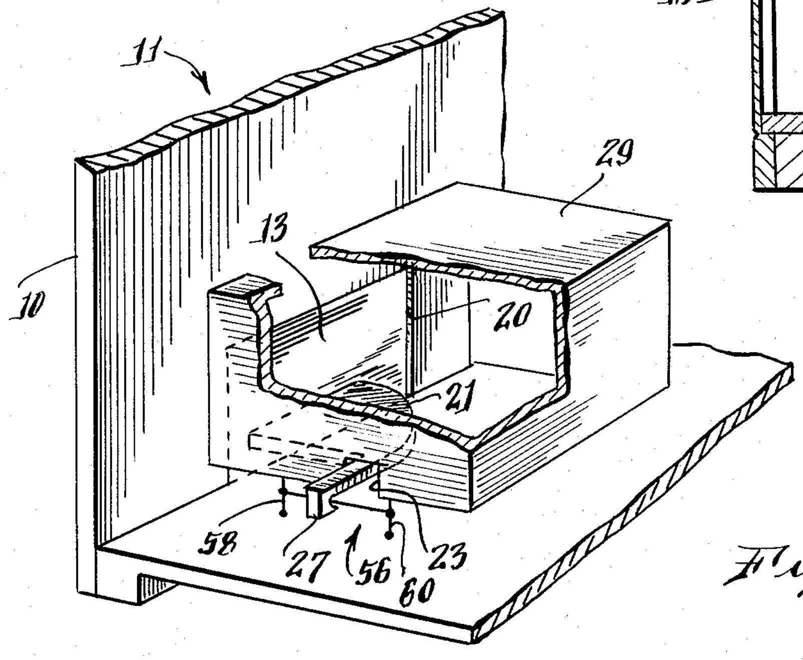
FIG. 3 is a perspective, partially broken view of an alternate embodiment of the present invention.

Referring to FIG. 3 a second embodiment of the invention is illustrated. Meter 11 includes housing 10 and mounted therewithin is an inner housing 29 which surrounds aperture 20 and provides tamper-proof protection as well as electromagnetic interference protection for the interior of housing 10. Reduced thickness portion of housing 10 forms a break-away door 13 and mounted securely on or formed integrally with door 13 is a lever member 21 having an extended portion 27 which projects through opening 23 in inner housing 29. The inner end 27 of member 21 has a hook member formed thereon which engages switch 56. Opening break-away door 13 draws hook member 27 away from switch 56 such that inner end 27 opens switch 56. In this manner the power supply 40 is disengaged from the electronic components of the meter 11.

In both the FIG. 1 and FIG. 3 embodiments opening of door 13 provides access to communication channel 26 (not shown in FIG. 3) so that an externally applied probe 28 can engage communication channel 26 to read out the nonvolatile memory 24. As shown, communication channel 26 does not provide access to the nonvolatile memory 24 which would permit unauthorized writing in of new or changed information to the accounting registers.

When a malfunction of the postage meter 11 is encountered the contents of memory register 24 can be read by accessing door 13 in order to transfer the postal balance in the inoperative meter to a replacement meter, thereby avoiding a lengthy delay during repair of the malfunctioning meter.

In recapitulation, it will be seen that an electronic postage meter has been provided with a security system such that transfer of the accounting information contained in the nonvolatile memory can be made at the postal service location without the lengthy delay usually required while the meter is returned to a repair location and then taken to the postal service for recharging and resetting. It will be seen that this access is permitted in a secure fashion which disables the meter for further use thereby preventing unauthorized changing of the contents of the nonvolatile memory or operation of the meter and postage printer.

It is therefore evident that there has been provided in accordance with the present invention a security system for an electronic device that fully satisfies the objects, aims and advantages set forth above. While this invention has been described in conjunction with specific embodiments thereof, it is evident that many alternatives, modifications and variations will be apparent to those skilled in the art. Accordingly, it is intended to embrace all such alternatives, modifications and variations that follow within the spirit and scope of the appended claims.

What is claimed is:

1. An electronic calculating device comprising a memory means having accounting information registered thereon, a control means for calculating the accounting information and entering the information into the memory means, a power supply providing power to the control means, a switch means having a first position in which an electrical connection is provided between the power supply and the control means and a second position in which the power supply is disconnected from the control means, the switch means being in the first position during normal operation of the calculating device, a secured housing enclosing the memory means, the control means, and the switch means and preventing access thereto during normal operation of the calculating device, an aperture in the housing permitting access to the memory means to read out accounting information registered thereon, a removable door covering the aperture, means for moving the switch to a second position when the door is removed, the switch being prevented from movement back to the first position when the door is removed unless authorized personnel are given access thereto and means for reading the accounting information out of the memory means through the aperture in the housing.

2. An electronic calculating device comprising a nonvolatile memory having accounting information registered thereon, a control circuit for calculating the accounting information and entering the information into the nonvolatile memory, a power supply providing power to the control circuit, a two position electrical switch having a first switch position which provides a completed circuit from the power supply to the control circuit and a second switch position in which the circuit from the power supply to the control circuit is disconnected, the switch being in the first position during normal operation of the calculating device, a secure housing enclosing the nonvolatile memory, the control circuit and the switch and preventing access thereto during normal operation of the calculating device, an access aperture in the housing permitting access to the nonvolatile memory to read out accounting information registered thereon, a removable door covering the aperture, means for moving the switch to a second position when the door is removed, the switch being prevented from movement back to the first position when the door is removed unless authorized personnel are given access thereto and means for reading the accounting information out of the memory through the aperture in the housing.

3. An electronic calculating device as set forth in claims 1 or 2 wherein the removable door is a reduced thickness portion of the housing forming the access aperture when the door is removed.

4. An electronic calculating device as set forth in claims 1 or 2 wherein removal of the door provides a visual indication that access to the device has been provided.

5. An electronic calculating device as set forth in claim 2 wherein the nonvolatile memory includes a communication channel which permits readout of data contained in the memory, but prohibits writing of data into the memory and wherein the access aperture permits insertion of an electronic probe for electrical connection to the communication channel of the nonvolatile memory.

6. An electronic postage meter comprising a nonvolatile memory having postage funds accounting information registered thereon, a control circuit for calculating the accounting information and entering the information into the nonvolatile memory, a power supply providing power to the control circuit, a two position electrical switch having a first switch position which provides a completed circuit from the power supply to the control circuit and a second switch position in which the circuit from the power supply to the control circuit is disconnected, the switch being in the first position during normal operation of the postage meter, a secured housing enclosing the nonvolatile memory, the control circuit, and the switch and preventing access thereto during normal operation of the postage meter, a break-away door formed in the housing and interconnected with the switch, an access aperture formed when the break-away door is removed permitting access to the nonvolatile memory to read out postage funds accounting information registered thereon, means for moving the switch to a second position when the door is removed, the switch being prevented from movement back to the first position when the door is removed unless authorized personnel are given access thereto and means for reading the accounting information out of the memory through the aperture in the housing.

7. An electronic postage meter as set forth in claim 6 wherein the moving means is a lever arm mounted on and in operative engagement with the switch for moving the switch to the second position.

8. In a postage meter having a secure housing which provides protection from tampering and electromagnetic interference for the contents of the housing, and a nonvolatile memory containing accounting information located within the housing; the postage meter further comprising;

a control circuit for calculating the information and entering the information into the memory, an access door in the housing providing access to the nonvolatile memory, the access door being constructed such that opening the door one time prevents its use as a door again, means operatively associated with the door for disabling the control circuit of the meter from further operation upon opening of the door unless authorized personnel are given access thereto, and means for reading the accounting information out of the memory when the access door is opened.

9. A postage meter as set forth in claim 8 wherein the access door is in the form of a reduced thickness portion of the housing to form a break-away member.

10. A postage meter as set forth in claim 8 wherein the disabling means is a switch which is operated by the opening of the door.

11. A postage meter as set forth in claim 8 wherein the accounting information reading out means is an electronic probe adaptable for reading the accounting information out of the device.

* * * * *